UNITED STATES PATENT OFFICE.

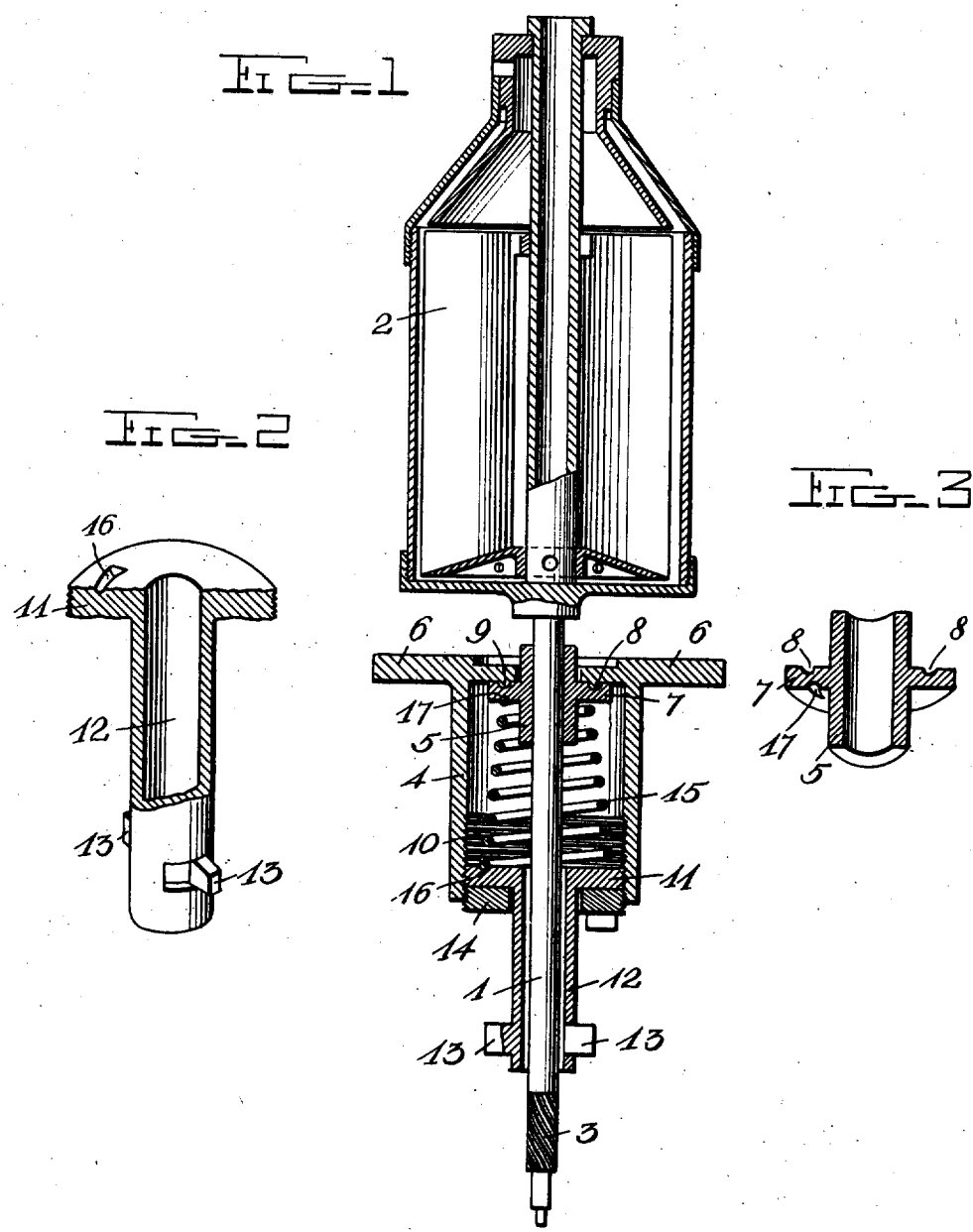

EDGERLY R. BAILEY, OF CLARINDA, IOWA.

JOURNAL-BEARING.

No. 901,140.  Specification of Letters Patent.  Patented Oct. 13, 1908.

Application filed August 30, 1907. Serial No. 390,697.

*To all whom it may concern:*

Be it known that I, EDGERLY R. BAILEY, a citizen of the United States, residing at Clarinda, in the county of Page and State of Iowa, have invented certain new and useful Improvements in Journal-Bearings; and I do declare the following to be a full, clear, and exact description of the invention, such as will enable others skilled in the art to which it appertains to make and use the same.

This invention relates to journal bearings, and more particularly to means for yieldingly and adjustably supporting the same.

The object of the invention is to provide such means that a bearing which is subject to sudden and variable lateral strain or pressure, as the bowl shaft of a centrifugal cream separator, can be adjusted while the machine is running to prevent wabbling.

In the accompanying drawings which illustrate the invention, Figure 1 is a vertical sectional view of the bearing as applied to a cream separator; Fig. 2 is a broken perspective view of the adjusting member; and Fig. 3 is a sectional perspective view of the portion of the bearing that engages directly with the shaft.

Referring more particularly to the drawings, which are for illustrative purposes only, and, therefore, are not drawn to scale, 1 indicates a shaft which may be used in any desired position, and for any desired purpose, it being shown as vertical in the drawings, and provided at its upper end with a bowl, 2, of an ordinary cream separator. Its lower end is shown as being stepped or shouldered and provided with a worm, 3, for rotating, although it may be rotated in any other suitable manner.

The bearing proper comprises two portions, 4 and 5, one of which, as 4, is substantially of an inverted cup shape and is adapted to be secured where the shaft is to be mounted, as by means of flanges, 6, and the other portion is bored longitudinally for direct engagement with the shaft, and is provided with an annular flange, 7, which is provided with a groove, 8, and is adapted to engage with an annular rib, 9, around the perforation of the portion 4.

The outer portion 4 of the bearing is cylindrical, with its lower end interiorly screw-threaded, as shown at 10, within which is adjustably mounted a nut, 11, which is provided with a depending cylindrical portion, 12. The lower end of the extension 12 is provided with suitable means for rotating it, as a laterally projecting wing or ear, 13, which is preferably formed by stamping out a portion of the extension, and is adapted to be grasped by the hand or any suitable tool for rotating it and the nut 11 for the purpose of adjustment. A jam nut, 14, is adapted to fit in the lower end of the portion 4 below the nut 11 and lock the same in its adjusted position.

Yielding means is provided within the bearing, as, for instance, a coiled spring, 15, for engaging with the nut 11 and the inner portion 5 for holding the grooved portion 8 of the flange 7 in engagement with the rib 9 and thereby holding the portion 5 in its desired axial position.

The contact surfaces of the rib 9 and the groove 8 may be of any desired shape in cross section, but I prefer making them curved or semi-circular, whereby the lateral movement of the interior or journal bearing portion 5 is more readily controlled. The ends of the spring 15 are also preferably seated in recesses, 16 and 17, in the nut 11 and flange 7, respectively, to prevent the rotation of the journal bearing portion 5 with the shaft.

As above described, it is evident that in its normal condition the shaft will be held in its proper axial alinement, but, in case of any lateral movement, as, for instance, the varying of the load upon one side or the other of the separator will cause lateral strain or pressure to a greater or less extent. With a rigid bearing for the shaft, this strain is very severe upon the bearing in case the variation in the load should be very great or excessive, but, with a bearing as above described, the portion 5 will be moved laterally to accommodate this strain by forcing the portion 5 down against the pressure of the spring 15 and thereby prevent injury or strain to the mechanism. As soon, however, as the load is diminished or removed, the pressure of the spring upon the flange 7 will cause the portion 5 to move into its normal position with the rib 9 seated in the groove 8.

If at any time the tension of the spring is found to be insufficient for properly controlling the movement of the journal bearing 5, the nut 11 can be easily screwed up into the cylindrical portion 4 to increase the tension of the spring, or screwed downwardly to decrease it, as may be desired, after which it can be locked in the desired position by means of the jam nut 14. As the nut 11 can be adjusted at any time by means of the extension 12 and the wing 13, the tension of the spring can be adjusted while the shaft is running, thereby peculiarly adapting the use of the bearing for cream separators, where it frequently becomes necessary to change the tension of the spring without stopping the rotation of the separator bowl.

Although I have shown a very desirable form of constructing my improved bearing, it is evident that changes or modifications can be made in the same, and I reserve the right to make all such variations as will come within the terms of the appended claims.

Having thus fully described my invention, what I claim as new and desire to secure by Letters-Patent is:

1. In a shaft bearing the combination of a bearing sleeve to engage with a shaft, an inverted cup the bottom of which is apertured, means for detachably connecting said cup bottom and said bearing sleeve, the lower end of said inverted cup being internally screw threaded, an adjusting nut operatively engaging said screw threaded portion and provided with a tubular extension, means for rotating said tubular extension, a nut and a spring arranged between said nut and the bearing sleeve.

2. In a shaft bearing, a bearing sleeve adapted to engage with a shaft and provided with a grooved flange, an inverted cup, the bottom of which is apertured and provided with an annular rib adjacent to said aperture, and the lower end of said cup being interiorly screw-threaded, an adjusting nut in said lower end provided with a hollow extension, means on the extension for rotating it and the nut, and a spring between said nut and said flange.

In testimony whereof I have hereunto set my hand in presence of two subscribing witnesses.

EDGERLY R. BAILEY.

Witnesses:
L. N. CLEVELAND,
JEANNETTE E. PAINTER.